United States Patent [19]

Niebylski

[11] Patent Number: 5,196,059
[45] Date of Patent: Mar. 23, 1993

[54] PRECERAMIC COMPOSITIONS AND CERAMIC PRODUCTS

[75] Inventor: Leonard M. Niebylski, Birmingham, Mich.

[73] Assignee: Ethyl Corporation, Richmond, Va.

[21] Appl. No.: 446,622

[22] Filed: Jan. 17, 1990

Related U.S. Application Data

[63] Continuation-in-part of Ser. No. 301,450, Jan. 25, 1989, abandoned.

[51] Int. Cl.⁵ .................................................. G09K 15/02
[52] U.S. Cl. .............................. 106/287.11; 556/412; 528/22
[58] Field of Search .................. 106/287.11; 556/412; 528/22

[56] References Cited

U.S. PATENT DOCUMENTS

| | | | |
|---|---|---|---|
| 4,482,669 | 11/1984 | Seyferth et al. | 524/442 |
| 4,873,353 | 10/1989 | Niebylski | 556/402 |
| 4,910,173 | 3/1990 | Niebylski | 528/4 |

Primary Examiner—Mark L. Bell
Assistant Examiner—David M. Brunsman
Attorney, Agent, or Firm—Patricia J. Hogan

[57] ABSTRACT

Preceramic compositions which are useful in providing protective ceramic coatings on silica foams, carbon/carbon composites, graphite, and other materials are prepared by dispersing about 0-3 parts by weight of aluminum-silicon eutectic, about 0-4 parts by weight of silicon carbide, about 1.5-5 parts by weight of silicon boride, and about 0.4-5 parts by weight of silicon metal in a solution of one part by weight of a polysilazane in an organic solvent.

7 Claims, No Drawings

PRECERAMIC COMPOSITIONS AND CERAMIC PRODUCTS

CROSS-REFERENCE TO RELATED APPLICATION

This application is a continuation-in-part of copending application Ser. No. 301,450, filed Jan. 25, 1989.

FIELD OF INVENTION

This invention relates to ceramic coatings and more particularly to such coatings derived from polysilazanes.

BACKGROUND

It is known that many carbonaceous materials, such as carbon/carbon composites and graphite, as well as other materials, such as silica foams, have properties which make them attractive for use in aerospace, tooling industry, and other applications but that articles formed from them can be damaged by heat, abrasion and/or oxidation. It would be desirable to find a means of protecting them from such damage.

As disclosed in U.S. Pat. Nos. 4,397,828 (Seyferth et al.-I), 4,482,669 (Seyferth et al.-II), 4,645,807 (Seyferth et al.-III), 4,650,837 (Seyferth et al.-IV), and 4,659,850 (Arai et al.), it is known that ceramics can be obtained from polysilazanes. Seyferth et al.-II teach that their polysilazanes can be used to make coatings or to serve as binders for ceramic powders, such as silicon carbide.

THE INVENTION

It has now been found that carbonaceous and other materials can be protected against heat, abrasion and/or oxidation by providing them with ceramic coatings derived from compositions obtained by intimately dispersing about 0-3 parts by weight of aluminum-silicon eutectic, about 0-4 parts by weight of silicon carbide, about 1.5-5 parts by weight of silicon boride, and about 0.4-5 parts by weight of silicon metal in a solution of one part by weight of a polysilazane in an organic solvent.

The polysilazane used in the practice of the invention may be any polysilazane that is soluble in common organic solvents, such as aliphatic or aromatic hydrocarbons, dialkyl or alicyclic ethers, etc.; and it may be, e.g., a polysilazane of Seyferth et al.-I, Seyferth et al.-II, Seyferth et al.-III, Seyferth et al.-IV, or Arai et al., the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or, alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldichlorosilane with ammonia and isolating the ammonolysis product.

The solvent employed for the polysilazane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.; and mixtures thereof.

The solids which are intimately mixed with the polysilazane solutions to form the dispersions of the invention are constituted by about 0-3 parts by weight of aluminum-silicon eutectic, about 0-4 parts by weight of silicon carbide, about 1.5-5 parts by weight of silicon boride, and about 0.4-5 parts by weight of silicon metal per part by weight of polysilazane. The silicon carbide is preferably α-silicon carbide, the silicon boride may be silicon tetraboride and/or silicon hexaboride, and the silicon metal is preferably amorphous.

In the preparation of the dispersions, it is preferred to premix the silicon boride, silicon metal, and any aluminum-silicon eutectic and/or silicon carbide, homogenize and dry them, and preferably also disperse them in an organic medium, such as the organic solvents mentioned above, before intimately mixing them with the polysilazane solutions. It is also preferred to prepare the dispersions of the invention by adding the homogenized solids, whether predispersed or not, to clear polysilazane solutions and agitate the resultant dispersions until they are uniform.

When the homogenized solids are predispersed in an organic medium, the amount of organic medium used is generally such that the ultimate dispersion has a total solids content of about 5-75% by weight, preferably about 30-60% by weight, to make the dispersions especially suitable for use as coating and/or infiltration materials.

The dispersions of the invention are preceramic materials which are useful for coating carbonaceous and other materials, such as fibers, tows, hanks, mats, and composites of carbon; carbon or graphite slabs, rods, and structures; silica or zirconia foams; etc., for which it is desired to provide a heat-, oxidation- and/or abrasion-resistant coating. (They also serve as infiltrants when the substrates are porous.) When the dispersions are to be used to provide protective ceramic coatings on such materials, the surfaces to be coated are usually cleaned prior to the application of the coating composition in order to improve the bonding of the ceramic coating to the substrate. The bonding can sometimes be further improved by pre-etching the surfaces to be coated and/or by including an anchoring agent, such as tris(dimethylamino)boron, in the dispersion or pre-treating the surfaces with such an anchoring agent.

The dispersions of the invention may be applied to the substrates in any suitable manner, such as by spraying, swabbing, or brushing, to form coatings having the desired thickness, generally a thickness of up to about 1000 micrometers, frequently a thickness of about 50-125 micrometers.

A coating of a desired thickness can be achieved by applying a single coating of that thickness or by applying the precursor polymer coating composition in multiple thinner layers, e.g., by applying the coating composition in layers of about 25-100 micrometers, each layer being dried by driving off the solvent before the next layer is applied.

When temperatures as high as about 200°-250° C. are used to drive off high boiling solvents, some pyrolysis of the preceramic polymer is initiated during the drying of the coating composition. However, higher temperatures, i.e., about 675°–900° C., preferably about 825°–875° C., are required to convert the preceramic coating to a ceramic coating. This pyrolysis may be delayed until the final desired thickness of preceramic coating has been deposited. However, it is generally preferred to pyrolyze each one or two layers of dried preceramic coating before applying the next layer of coating composition. The time required for the pyrolysis is generally about 1–60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°–875° C., it is generally preferred to pyrolyze the first coat for only about five minutes and then to pyrolyze subsequent coats for longer times up to about 15 minutes.

When the coating is intended to protect a substrate from oxidative deterioration at very high temperatures, e.g., temperatures higher than 800° C., each pyrolysis is followed by thermal treatment of the coated substrate at about 1075°–1250° C., preferably about 1100°–1175° C., most preferably about 1125° C., in an atmosphere containing not more than a minor amount of oxygen, e.g., in a nitrogen, argon, or helium atmosphere, to convert the ceramic coating into a homogeneous film. This treatment may be accomplished by raising the temperature in the vessel used for the pyrolysis or by transferring the coated substrate to a vessel maintained at the higher temperature; and it is preferably continued for about five minutes for the first coat and longer periods, e.g., about 15–20 minutes, for subsequent coats.

After the pyrolysis employed in providing a ceramic coating, the coated substrate is cooled. Optimum results are attained when this cooling is accomplished at a rate not greater than about 50° C./minute, preferably about 20°–30° C./minute, until the substrate temperature is below 500° C., at which time further cooling may be accomplished at ambient air temperature.

Although not essential, it is preferred to keep the starting polysilazane and compositions formed from it in a dry atmosphere until a layer of ceramic has been formed because of the susceptibility of the preceramic materials to attack by water and other compounds having active hydrogens.

The invention is particularly advantageous as a means of providing heat-, oxidation- and abrasion-resistant coatings on carbonaceous and other substrates, such as the carbonaceous and silica foam materials used in aerospace applications. However, it is also useful in improving other properties of the substrates, e.g., in increasing the rigidity of silica foams.

The following examples are given to illustrate the invention and are not intended as a limitation thereof.

EXAMPLE I

Synthesis of Polysilazane

Part A

A suitable reaction vessel was charged with 14L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0°–10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6 g (0.13 mol) of dimethylchlorosilane to the polymerization solution.

The polymer product was isolated by (1) concentrating the product solution to about 4L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Preparation of Dispersions

Part A

Dispersion A was prepared by (A) homogenizing and vacuum-drying for at least two hours a mixture of 0.3 part by weight of aluminum-silicon eutectic, 0.75 part by weight of α-silicon carbide, 1.5 parts by weight of silicon hexaboride, and 0.75 part by weight of amorphous silicon metal, (B) adding a 60% solids solution of the polysilazane of Example I in a 3/1 mixture of 1-methyl-2-pyrrolidone and xylene in an amount such as to provide one part by weight of the polysilazane, and (C) intimately mixing the ingredients to form a dispersion.

Part B

Dispersion B was prepared by repeating Part A except for employing a mixture of 0.3 part by weight of aluminum-silicon eutectic, 0.5 part by weight of α-silicon carbide, 1.5 parts by weight of silicon hexaboride, and 1.0 part by weight of amorphous silicon metal.

Part C

Dispersion C was prepared by repeating Part A except for employing a mixture of 0.3 part by weight of aluminum-silicon eutectic, 0.5 part by weight of α-silicon carbide, 1.5 parts by weight of silicon hexaboride, and 1.5 parts by weight of amorphous silicon metal.

EXAMPLE III

Inhibited carbon/carbon composite coupons (i.e., carbon/carbon composite coupons containing an oxidation inhibitor) having nominal dimensions of about 2.5 cm×2.5 cm×0.34 cm were cleaned, abraded, cleaned again, etched with nitric and hydrofluoric acids, recleaned, dried, thoroughly swab-coated in an inert atmosphere with Dispersion A, dried, heated at 825°–875° C. to pyrolyze the coating to form a ceramic and then at 1199°–1175° C. to convert the ceramic coating to a homogeneous film, cooled at a rate of about 20°–30° C./minute until the substrate temperature was below 500° C., and then allowed to cool to room temperature under ambient air conditions. After the coated coupons had been cooled, they were provided with three additional ceramic coats in essentially the same manner to provide coupons having a coating thickness of about 0.08–0.1 mm.

The effectiveness of the ceramic coats thus obtained in protecting the substrates from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to about 1095° C. and held there for 2–3 hours, after which (1) the holder and specimen were removed from the furnace and quenched in ambient air, (2) the cooled specimen was weighed and returned to the furnace, and (3) the heating for 2–3 hours, quenching, weighing, and returning to the furnace were repeated until the total test time was 24 hours. The weight loss on oxidation was determined to be only 32–41% after 24 hours. This compares with an oxidation weight loss of 100% after 24 hours when the uncoated inhibited carbon/carbon composite coupons were subjected to the same oxidation test.

EXAMPLE IV

Example III was essentially repeated except that Dispersion B was used instead of Dispersion A. The oxidation weight loss after 24 hours was only 21–26%.

EXAMPLE V

Example III was essentially repeated except that Dispersion C was used instead of Dispersion A. The oxidation weight loss after 24 hours was only 12–20%.

It is obvious that many variations can be made in the products and processes set forth above without departing from the spirit and scope of this invention.

What is claimed is:

1. A dispersion consisting essentially of aluminum-silicon eutectic, silicon carbide, silicon boride, and silicon metal in a solution of one part by weight of a polysilazane in an organic solvent, wherein the amount of aluminum-silicon eutectic is about 0–3 parts by weight, silicon carbide is about 0–4 parts by weight, silicon boride is about 1.5–5 parts by weight, and silicon metal is about 0.4–5 parts by weight, all per one part by weight polysilazane.

2. The dispersion of claim 1 wherein the silicon carbide is α-silicon carbide.

3. The dispersion of claim 1 wherein the silicon boride is silicon tetraboride.

4. The dispersion of claim 1 wherein the silicon boride is silicon hexaboride.

5. The dispersion of claim 1 wherein the silicon metal is amorphous.

6. The dispersion of claim 1 wherein the polysilazane is a polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

7. The dispersion of claim 6 wherein the organodihalosilane is methyldichlorosilane and the basic catalyst is potassium hydride.

* * * * *